United States Patent [19]

Kobayashi et al.

[11] Patent Number: 4,833,772
[45] Date of Patent: May 30, 1989

[54] AUTOMATIC TOOL CHANGING APPARATUS

[75] Inventors: Mitsuo Kobayashi, Mie; Hiroaki Nomura, Aichi, both of Japan

[73] Assignee: Brother Kogyo Kabushiki Kaisha, Nagoya, Japan

[21] Appl. No.: 100,355

[22] Filed: Sep. 23, 1987

[30] Foreign Application Priority Data

Nov. 12, 1986 [JP] Japan .................. 61-269242

[51] Int. Cl.⁴ .......................................... B23Q 3/157
[52] U.S. Cl. ...................................................... 29/568
[58] Field of Search ..................... 29/568, 26 A, 26 R; 211/1.5; 414/776, 779, 783

[56] References Cited

U.S. PATENT DOCUMENTS

| | | | |
|---|---|---|---|
| 3,608,188 | 9/1971 | Seidel | 29/568 |
| 3,691,626 | 9/1972 | Mousseau et al. | 29/568 |
| 3,964,616 | 6/1976 | Piotrowski | 29/568 X |
| 4,050,146 | 9/1977 | Geiger | 29/568 |
| 4,484,387 | 11/1984 | Nachmany | 29/568 |

FOREIGN PATENT DOCUMENTS 60-228047 11/1985 Japan .
61-164743 7/1986 Japan .
61-249239 11/1986 Japan .

Primary Examiner—William Briggs
Attorney, Agent, or Firm—Finnegan, Henderson, Farabow, Garrett & Dunner

[57] ABSTRACT

An automatic tool changing apparatus is disclosed which has first to fourth cam mebers (37, 42, 47, 51) integral with a drive shaft (23). The cam members operate cam index mechanism (FIG. 6), shaft drive mechanism (FIG. 7), claw driving mechanism (FIGS. 8 and 9), and tool clamp-unclamp driving mechanism (FIGS. 11 and 12). The apparatus comprises a main spindle head (3), a main spindle (11) rotatably disposed in the main spindle head (3), tool magazine (8) mounted on the main spindle head (3), a first sleeve (26) rotatably supported by the main spindle head (3), a second sleeve (30) slidable in axial direction thereof and rotatable together with the first sleeve (26), a swing arm (16) disposed at one end of the second sleeve (30), tool holding claws (15) provided at the swing arm (16), claw opening and closing means (FIG. 10) disposed in the swing arm (16), a drive shaft (23) rotatably supported by the main spindle head (3) and driven by a motor (17), the four cam members (37, 42, 47, 51), the cam index mechanism (FIG. 6), the shaft drive mechanism (FIG. 7), the claw driving mechanism (FIGS. 8 and 9), and the tool clamp-unclamp driving mechanism (FIGS. 11 and 12).

13 Claims, 14 Drawing Sheets

AUTOMATIC TOOL CHANGING APPARATUS

BACKGROUND OF THE INVENTION

The present invention relates to an automatic tool changing apparatus (ATC apparatus) for use in a machine tool.

According to a conventional tool changing apparatus such as a machining center, a swing arm which exchanges a tool between a tool magazine and a main spindle is disposed on a stationary member such as a column. Further, consequential tool exchanging operations such as tool holding by tool holding claws, tool removal, tool rotation by 180 degrees, new tool insertion, and tool clamping are each driven by hydraulic cylinders, and every one step of operation is acknowledged by a limit switch for the subsequent step of operation.

With this construction, the main spindle head is required to be displaced to the tool changing position, that is, the position at which the swing arm is disposed. This displacement of the main spindle head may prolong the entire operation.

Further, during the tool exchanging operation, termination of each one of the steps is verified and then the next step is conducted. Such sequencial steps do not permit overlapping steps, so that time consuming operation results. Furthermore, since the hydraulic cylinders are employed as driving sources, it would be rather difficult to control acceleration or deceleration during operation, and high speed operation is not attainable in the conventional apparatus.

Examples of the conventional tool changing apparatus are described in Japanese patent application publications(kokai) Nos. 68-45836, 60-228047, 61-164743, and Japanese patent publication No. 69-32257.

SUMMARY OF THE INVENTION

It is therefore, an object of the present invention to overcome the above mentioned drawbacks and to provide an improved automatic tool changing apparatus.

Another object of the present invention to provide such apparatus capable of performing high speed tool changing operation.

Still another object of the invention is to provide such apparatus which can minimize tool changing period Still another object of the invention is to provide such improved tool changing apparatus in which several tool changing steps are performed simultaneously.

Still another object of the invention is to provide the improved apparatus in which tool changing operation is performable regardless of the position of the main spindle head.

Still another object of the invention is to provide the improved apparatus capable of performing stabilized tool index operation in a tool magazine.

Still another object of the invention is to provide the improved apparatus in which operation mode is simplified and easily controllable.

These and other objects of the present invention will be attained by a plurality of cam members integrally provided on a drive shaft, and associated mechanical members responsive to the cam members. Briefly, and in accordance with the present invention, a first sleeve is rotatably supported by a main spindle head, and a second sleeve is disposed slidable in axial direction thereof with respect to the first sleeve and rotatable together with the first sleeve. One end portion of the second sleeve is provided with a swing arm in which provided are tool holding claws and a mechanism for opening and closing the claws. By the rotation of the swing arm about an axis of the second sleeve and displacement of the swing arm in axial direction of the second sleeve, a tool in the main spindle is changed by a tool in the tool magazine. The drive shaft driven by a drive motor mounted on the main spindle head is rotatably disposed on the main spindle head. The drive shaft integrally mounts thereon first to fourth cam members. Each of the cam members controls various tool changing operational steps performed by a cam-index mechanism, second sleeve axial driving mechanism, a tool holding claw drive mechanism for opening and closing the tool holding claws, and tool detachable mount drive mechanism. The cam-index mechanism serves to rotate the first sleeve about its axis and control the rotationaly angular position thereof in response to the first cam (37). The second sleeve axial driving mechanism serves to reciprocate the second sleeve in axial direction thereof and to control the axial position in response to the second cam (42). The tool holding claw driving mechanism serves to drive a mechanism for opening and closing the tool holding claws in response to the third cam (47). The tool detachable mount drive mechanism serves to drive a tool detachable mount mechanism in the main spindle for clamping and unclamping the tool therein in response to the fourth cam (51).

With this construction, four sets of cams 37 42 47 51 are operated by the rotation of a single drive shaft upon energization of the drive motor, and by following the cam operations, continuously performed are the successive tool changing operations such as holding of the tool by the tool holding claws, unclamping of the tool from the main spindle, removal of the tool from the main spindle and from the tool magazine by the downward movement of the swing arm, tool position replacement by the rotation of the swing arm, new tool insertion into the main spindle and into the tool magazine by the upward movement of the swing arm, tool clamping by the main spindle, and release of the tool from the tool holding claws by opening the same. Because of the operations in response to the cams, each of the operational positions is precisely controlled in response to the rotationally angular position of the drive shaft, which angular position provides specific vertical cam hight level or cam radial distance level relative to the drive shaft. Further, continuous operations results without any acknowlegement of termination of each steps for the subsequent step. Furthermore, a part of the operation step can be overlapped with the other operation step. The cam shapes are suitably designed so as to optimumly control acceleration or decceleration of each operation modes and to provide smooth and high speed tool changing operation. Futher, more, since the swing arm is disposed on the main spindle head, tool changing operation can be performed regardless of the position of the main spindle head, so that minimized tool changing period is obtainable.

DETAILED DESCRIPTION OF THE PREFERRED EMBODIMENT

One embodiment of the present invention will be described with reference to accompanying drawings.

Figure 2:
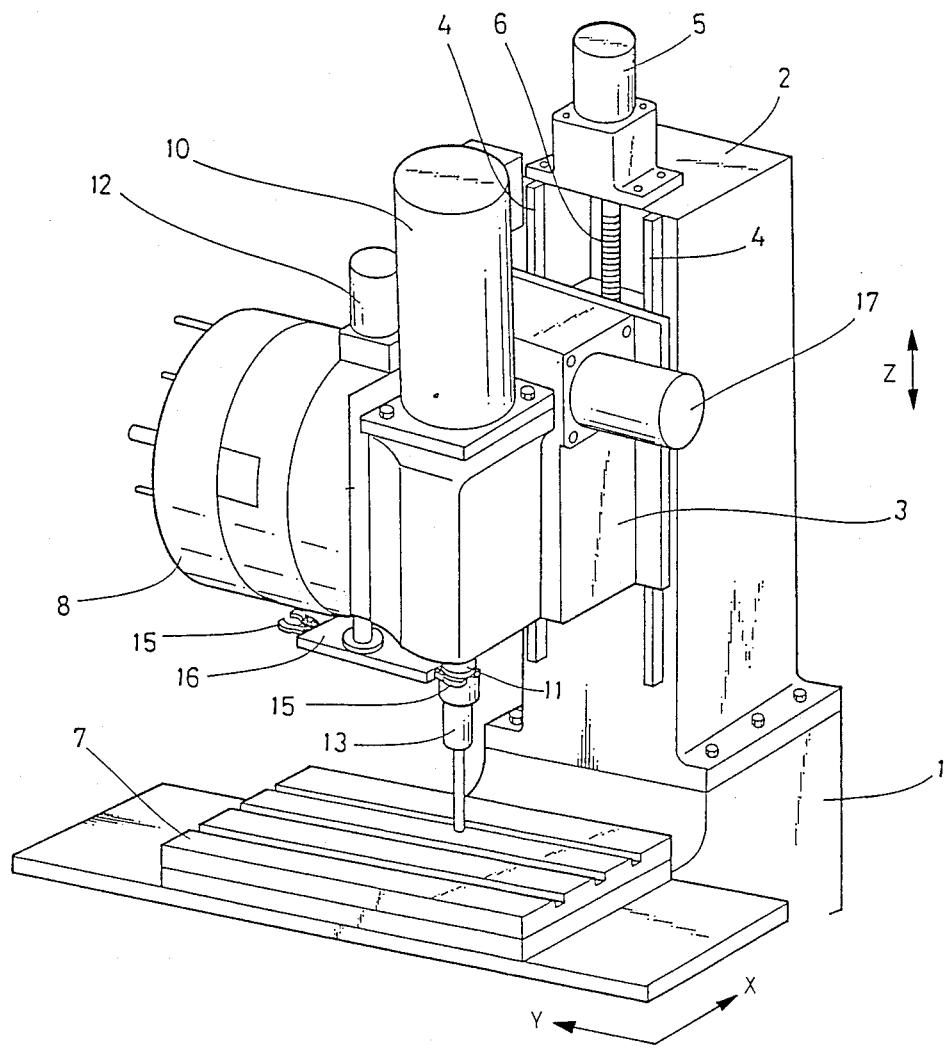
FIG. 2 is a perspective view showing an external view of the apparatus.
Figure 3:
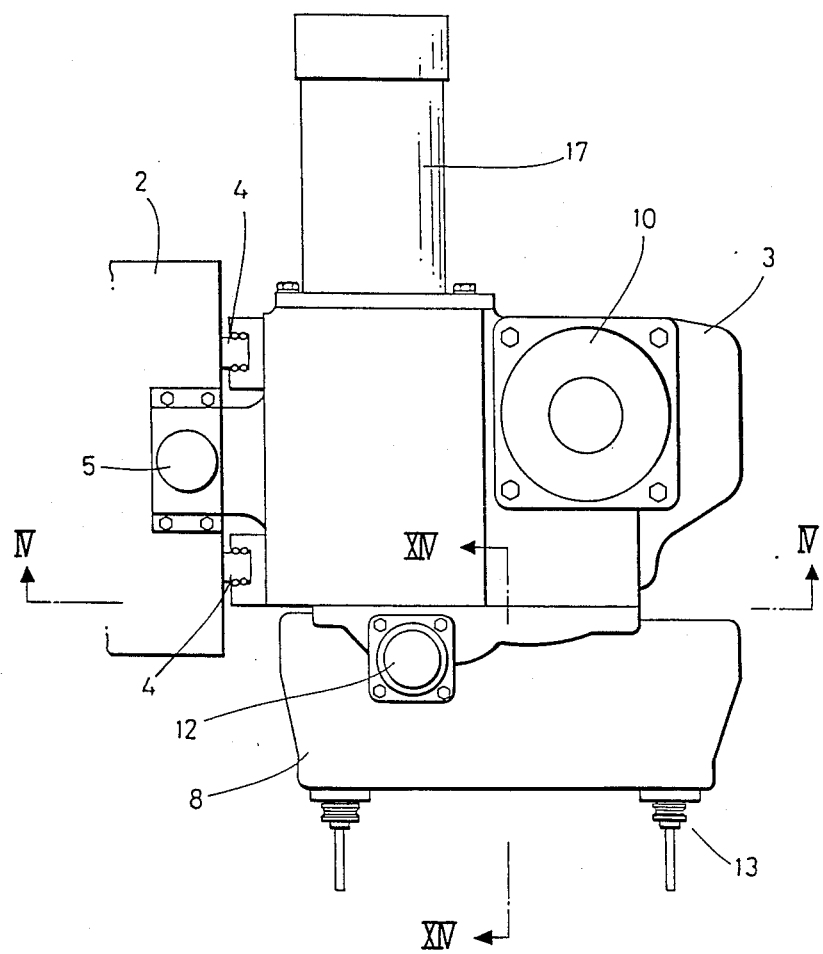
FIG. 3 is a plan view of FIG. 2.

FIG. 2 is a perspective view showing a machining center (M.C.)installing thereon a tool changing apparatus according to the present invention, and FIG. 3 is a plan view of the tool changing apparatus. As best shown in FIG. 2, a column 2 vertically extending from a base 1 supports a main spindle head 3. The main spindle head 3 is vertically movable along a linear guide 4 fixed to the column 2, and is driven by a rotation of a feed screw 6 coupled to a Z-direction drive motor 5 disposed at a top portion of the column 2. On the base 1, a table 7 is disposed which is movable in a horizontal plane (X- and y-directions). On the main spindle head 3, installed are a main spindle shaft motor 10 at its top, a main spindle 11 at its lower portion, and a tool magazine 8 at its side. A magazine motor 12 is provided onto the tool magazine 8 for rotating the latter to index one of the tools accomodated therin. Further, automatic tool changer means (ATC) is accomodated in the main spindle head 3 in order to change tools between the tool magazine 8 and the main spindle 11. The automatic tool changer means includes a swing arm 16 and tool changing drive motor (ATC motor). The swing arm 16 has both longitudinal ends provided with tool holding claws 15.

Figure 1:
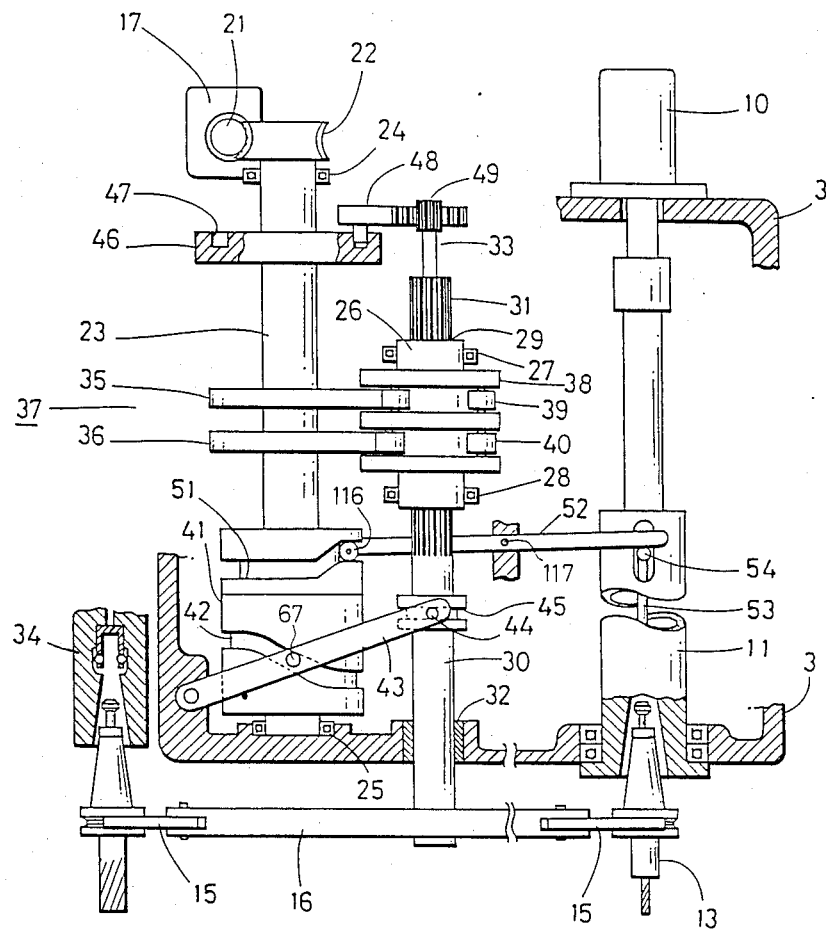
FIG. 1 is a schematic illustration showing an automatic tool changing apparatus according to the present invention.

FIG. 1 is a schematic illustration showing a mechanism of the tool changing apparatus according to the present invention in FIG. 1, rotation of the ATC motor 17 is transmitted to a tool changing drive shaft(ATC drive shaft) 23 through a worm 21 and a worm wheel 22. The ATC drive shaft 23 is rotatably supported by the main spindle head 3 by bearings 24 and 25. The ATC drive shaft 23 is provided with first to fourth cams 37, 42, 47 and 51, those being essential feature of the present invention.

On the other hand, a first sleeve is rotatably supported by the main spindle head 3 by bearings 27,28. The first sleeve 26 has an inner peripheral surface provided with a spline key 29 which is engaged with a spline portion 31 of a second sleeve 30. The second sleeve 3$0 is also supported by the main spindle head 3 at its upper and lower portions through the inner peripheral surface of the first sleeve 26 and a metallic bearing 32, respectively. The second sleeve 30 is rotatable together with the rotation of the first sleeve 26, and is axially movable because of the spline connection. The swing arm 16 is connected to the lower end portion of the second sleeve 30 whose central axis functions as a rotational center of the swing arm 16. Within the swing arm 16, housed is a mechanism for opening and closing the tool holding claws 15 (this mechanism will be described later with reference to FIGS. 5 and 10). A rotary rod 33 is engaged with a driving portion of the claw open and close mechanism. The rotary rod 33 extends through the second sleeve 30 and is rotatably supported by the main spindle head 3. Upon rotation of the rotary rod 33, the claws are opened or closed. The tool 13 is exchanged from each other between the main spindle 11 and a tool pod 34 of the tool magazine 8 by the swinging movement of the swing arm 16 and by vertical displacement thereof because of the rotation of the rotary rod 33 and axial movement of the second sleeve 30.

The first cam mounted to the ATC drive shaft 23 includes a composite plate cams 35 36 to thereby constitute a parallel or juxtaposed cam 37. The two plate cams 35 36 are in camming contact with driven rollers 39 40 of a driven piece 38 provided integral with the first sleeve 26, so that rotational angular position of the first sleeve 26 is defined. That is, the first sleeve 26 is intermittently rotated by 180 degrees per a single rotation of the ATC drive 23. (this mechanism is detailedly described later with reference to FIG. 6).

The second cam mounted to the ATC drive shaft 23 is defined by a circumferential grooved cam 42 (first grooved cam) formed on an outer peripheral surface of a cylindrical member 41 integral with the shaft 23. A pivot lever 43 is pivotally movable in response to the configuration of the grooved cam 42, and the pivot lever 43 has a contact piece 44 which is engaged with an annular groove 48 formed at an outer peripheral surface of the second sleeve 3O, so that the second sleeve 30 is movable in its axial direction, and its axial movement is controlled by the second cam 42. The second sleeve 30 performs an intermittent single reciprocation per a single rotation of the ATC drive shaft 23 (this mechanism will be detailedly described later with reference to FIGS. 4 and 7).

The third cam mounted on the ATC drive shaft 23 is formed at an upper surface of a disk member 46 integral with the shaft 23. The third cam is in a form of grooved cam 47 provided in a flat surface of the disk member 46. A rack 48 is movable in its longitudinal direction in response to the groove cam 47, and the rack is meshing engagement with a pinion 49 provided at the rotary rod 33. Therefore, the third cam 47 controls angular rotational position of the rod 33 (this mechanism will be detailedly described with reference to FIGS. 8 and 9). The tool holding claws 15 are opened or closed in response to the angular rotational position of the rotary rod 33.

The fourth cam is defined by a circumferential grooved cam 51 (second grooved cam) formed at an outer peripheral surface of the cylindrical member 41 integral with the shaft 23. The grooved cam 51 is engaged with one end of a pivot member 52 whose other end is engaged with a tool release pin 54 coupled to a draw bar 53 of a tool detachable mount means. The pivotal movement of the lever 52 urges the release pin 54 so as to provide unclamping state relative to the tool connected to the main spindle 11 (this mechanism will be described later with reference to FIGS.11-13).

Figure 4:
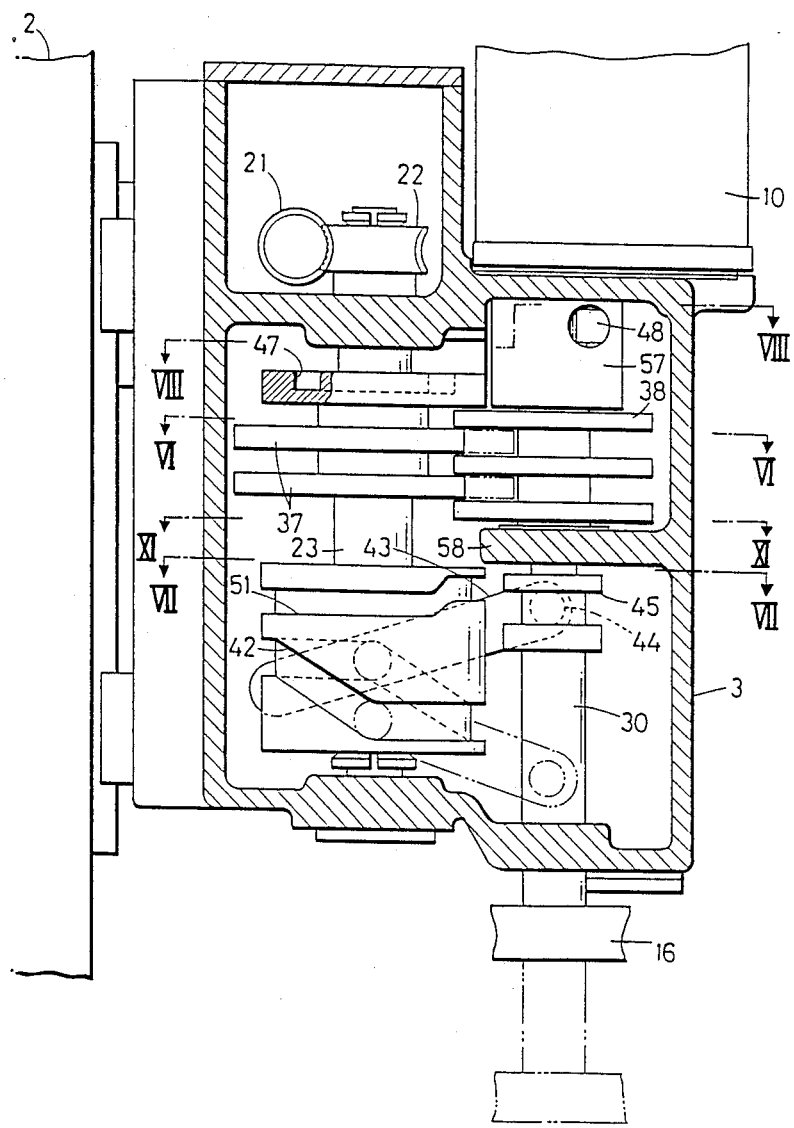
FIG. 4 is a cross-sectional view taken along the line IV—IV of FIG. 3.

The above-mentioned mechanisms will be described in detail. FIG. 3 is a plan view of the tool changing apparatus according to the present invention, and FIG. 4 is a cross-sectional view taken along the line IV-IV in FIG. 3, and in FIG. 4 removed is the tool magazine 8 mounted on the left side of the main spindle head Further, FIG. 5 is a vertical cross-sectional view showing the second sleeve 30.

Figure 5:
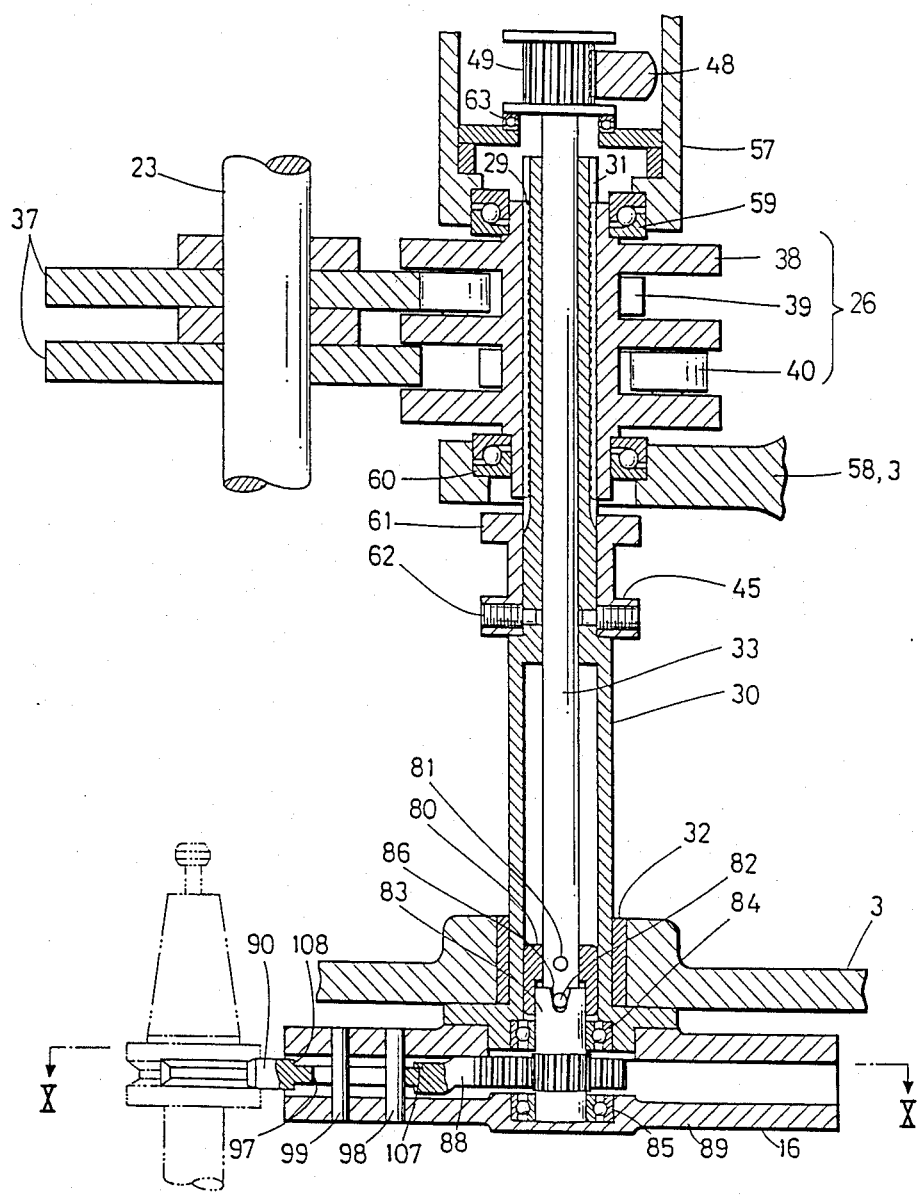
FIG. 5 is a cross-sectional view showing a second sleeve.

As best shown in FIG. 5, a hollow cylindrical bracket 57 is secured to the upper portion of the main spindle head 3. The upper portion of the first sleeve 26 is rotatably supported to the bracket 67 through a bearing 59, and the lower portion of the first sleeve 26 is rotatably supported to a rib portion 58 of the main spindle head 3 through a bearing 60. The first sleeve 26 includes a follower 38 responsive to the parallel cam 37 (first cam). The follower 38 includes three disk members vertically juxtaposed as shown, and a plurality of follower rollers 39 40 supported by the three disc members. An inner peripheral surface of the first sleeve 26 is formed with a spline key 29. The upper portion of the second sleeve 30 is provided with a spline 31 engageable with the spline key 29 of the first sleeve 26, so that the upper portion of the second sleeve is supported by the first sleeve 26. The lower portion of the second sleeve 30 is rotatably and axially movably supported by the main spindle head 3 through the metallic bearing 32. At an intermediate outer peripheral portion of the second sleeve 30, a link member 61 is fixedly secured by a thread 62. The link member 61 has an outer peripheral surface formed with an circumferential groove 45 with which the contact piece 44 of the pivot lever 43 is engaged. Therefore, axial position of the second sleeve 30 is defined and maintained by the pivotal movement of the pivot lever 43.

As shown in FIG. 5, the rotary rod 33 extends through the second sleeve 30. The rotary rod 33 is engaged with a mechanism for opening and closing the tool holding claws 15. The rotary rod 33 has an upper portion projecting from the distal end of the second sleeve 30 and the upper portion is rotatably supported by the bracket 57 through a bearing 63. The rotary rod 33 is not movable in axial direction thereof. The upper end portion of the rotary rod 33 is provided with a pinion 49 which is engaged with the rack 48 (see also FIG. 1) slidably supported by the cylindrical bracket 57 and reciprocally movable responsive to the grooved cam 47 (third cam). in FIG. 5, the rack 48 extends to a direction perpendicular to the drawing sheet.

Figure 6:
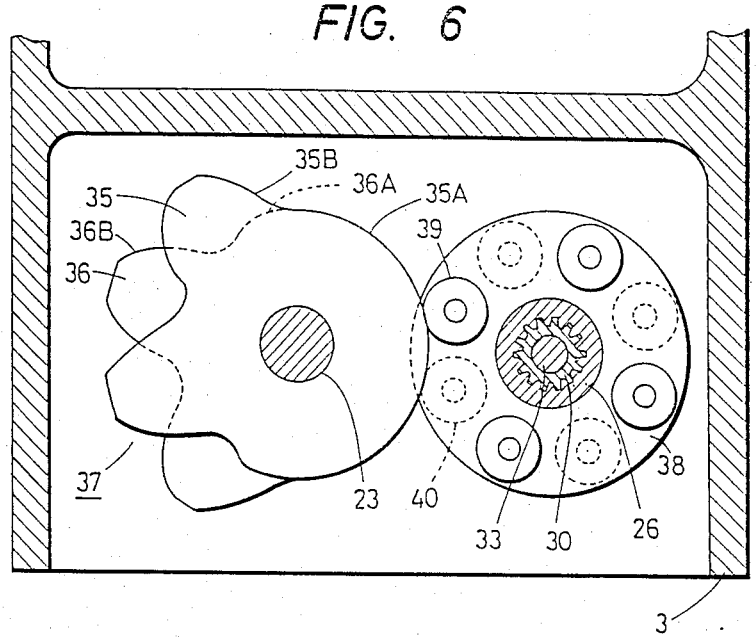
FIG. 6 is a cross-sectional view taken along the line VI—VI of FIG. 4 and showing a parallel cam(first cam)

A cam index mechanism for rotationally driving the second sleeve 30 will be described with reference to FIGS. 5 and 6. FIG. 6 is a cross-sectional view taken along the line VI—VI of FIG. 4. The two plate cams 35 36 are each provided with a circular portions 35A 36A and cam lobe portions 35B 36B. Cam lobe portion 35B 36B of one of the plate cams is angularly offset from the cam lobe portion 36B 35B of the other plate cam. Between neighbouring three disk members 38 which is provided integral with the first sleeve 26, four follower rollers 39 40 are rotatably provided in each of the spaces between the disks 38, so that the follower 38 is constituted which is operative by the parallel cam 37. The four rollers 39 at the upper space are positioned offset from the four rollers 40 at the lower space so as to provide staggered relationship as shown in FIG. 6. The two plate cams 35 36 are in camming contact with at least one of the follower rollers 39 40 of each four rollers. When the ATC drive shaft 23 is rotated, the cam lobe portions 35B 36B of the plate cams 35 36 are brought into engagement with the follower roller 39 40 as if these cam lobes function as gear teeth, so that the follower 38 is rotated to rotate the first sleeve 26. Further, as shown in FIG. 6, when the circular portions 35A 36A are in contact with the follower rollers 39 40, the upper and lower follower rollers 39 40 interpose the circular portions 35A 36A therebetween, so that the rotation of the first sleeve 26 is suspended regardless of the rotation of the plate cams 38 36 so for as the circular portions are in contact with the rollers. Each of the plate cams 35 36 has such configuration that the follower 38 is rotated by 180 degrees by the 180 degrees rotation of the plate cams, and the follower rotation is suspended by the remaining 180 degrees rotation of the cams.

Figure 7:
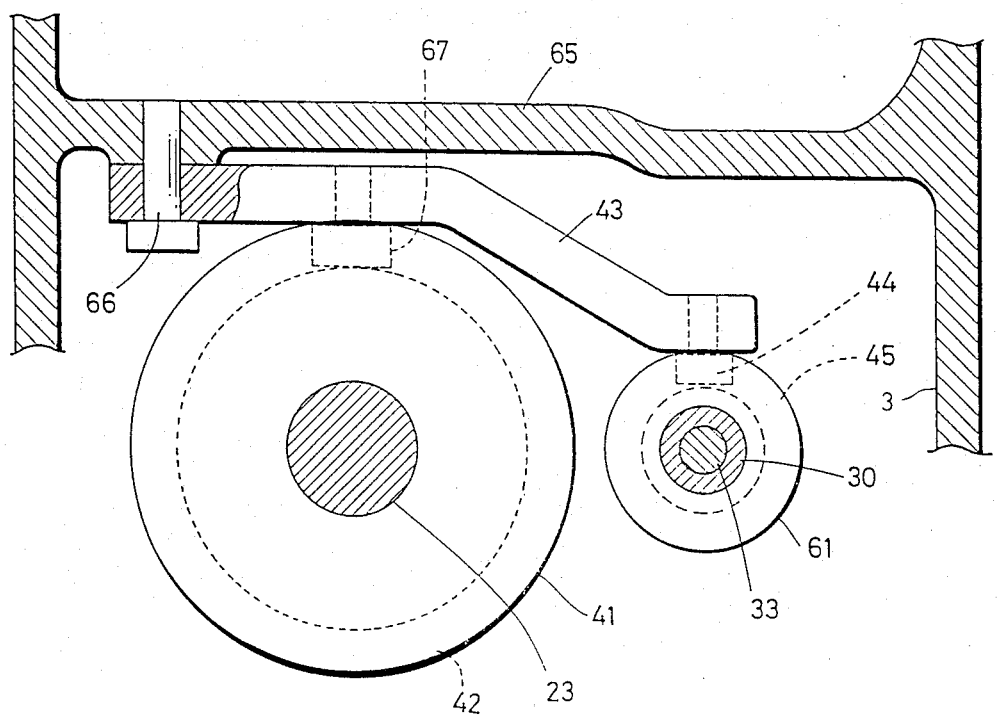
FIG. 7 is a cross sectional view taken along the line VII—VII of FIG. 4, and showing a first circumferential grooved cam (second cam)

A mechanism for reciprocating the second sleeve 30 in axial direction thereof will be described with reference to FIGS. 4 and 7. FIG. 7 is a cross-sectional view taken along the line VII—VII of FIG. 4. The pivot lever 43 has one end portion pivotally supported to a partition wall 65 of the main spindle head 3 by a pivot shaft 66. The lever 43 has an intermediate portion provided with a cylindrical cam follower 67 projecting sidewardly, and the lever 43 has a free end provided with a contact piece 44 in the form of a roller. The cam follower 67 is engaged with the second cam 42, i.e., the circumferential grooved cam (first grooved cam), and the contact piece 44 is engaged with the annular groove 45 formed at the link member 61 fixed to the second sleeve 30. Upon rotation of the ATC drive shaft 23, the second sleeve 30 is vertically moved in the axial direction thereof.

Figure 8:
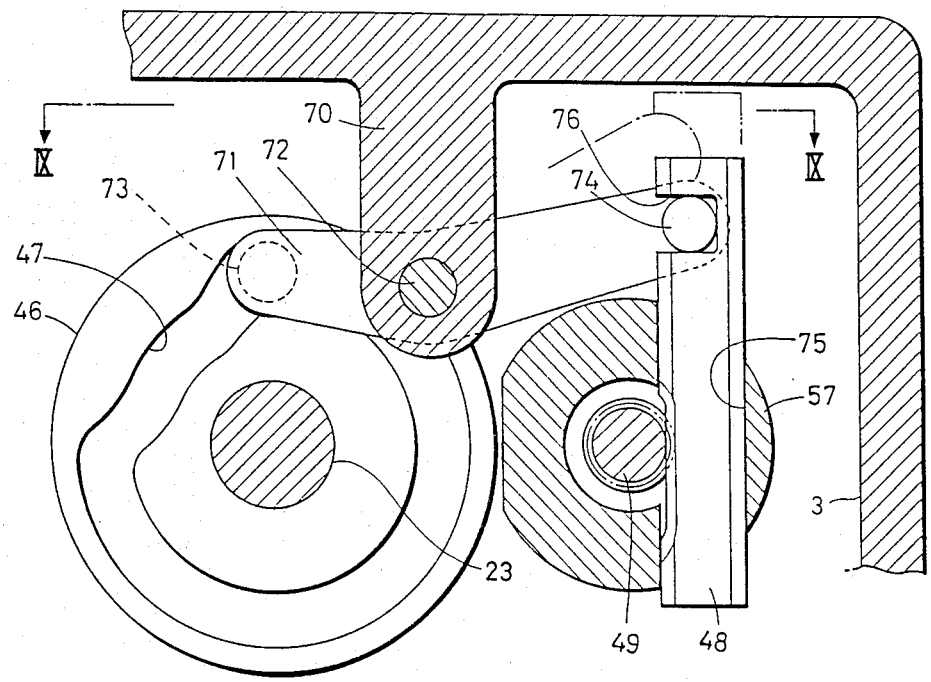
FIG. 8 is a cross-sectional view taken along the line VIII—VIII of FIG. 4 and showing a flat surface grooved cam (third cam)
Figure 9:
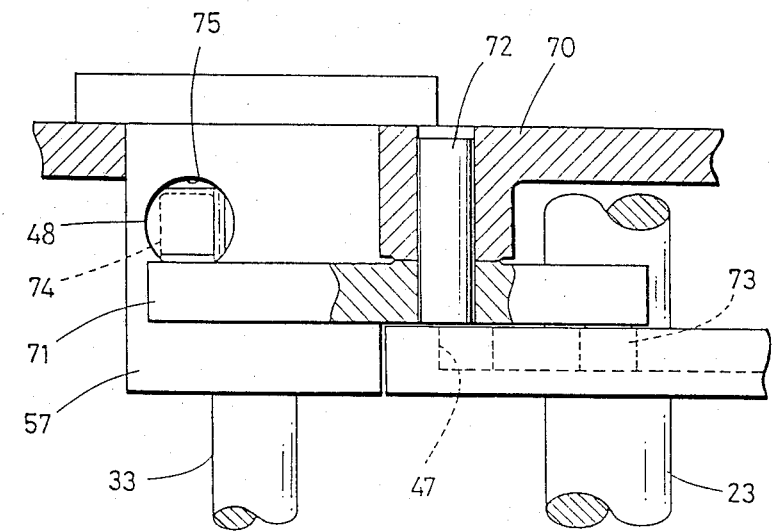
FIG. 9 is a cross-sectional view taken along the line IX—IX of FIG. 8.

Described next is a mechanism for rotating the rotary rod 33 responsive to the grooved cam 47 with reference to FIGS. 8 and 9. FIG. 8 is a cross-sectional view taken along the line VIII—VIII of FIG. 4, and FIG. 9 is a cross section taken along the line IX—IX of FIG. 8. in these Figures, an intermediate portion of a horizontal lever 71 is pivotally secured to a top wall 70 of the main spindle head 3 by a pivot shaft 72, so that the lever 71 is pivotable about the shaft 72 in horizontal plane. One end of the horizontal lever 71 is provided with a cylindrical cam follower 73 projecting downwardly, and the other end of the lever is provided with a cylindrical contact piece 74 projecting upwardly. The cylindrical bracket 57 which rotatably supports the upper end portion of the rotary rod 33 is formed with a guide hole 75 (FIG. 9) having circular cross-section Which allows the rack 48 to slidingly pass therethrough. As described above, the rack 48 engages the pinion 49 provided at the upper portion of the rotary rod 33. The rack has one end portion projecting out of the guide hole 75, and the end portion of the rack 48 is formed with an engaging recess 76 engageable with the contact piece 74 of the horizontal lever 71. The cam follower 73 is engaged with the grooved cam 47(third cam). When the ATC drive shaft 23 is rotated, the horizontal lever 11 is pivotally moved to move the rack 48 in its lengthwise direction, to thereby rotate the rotary rod 33.

Figure 10:
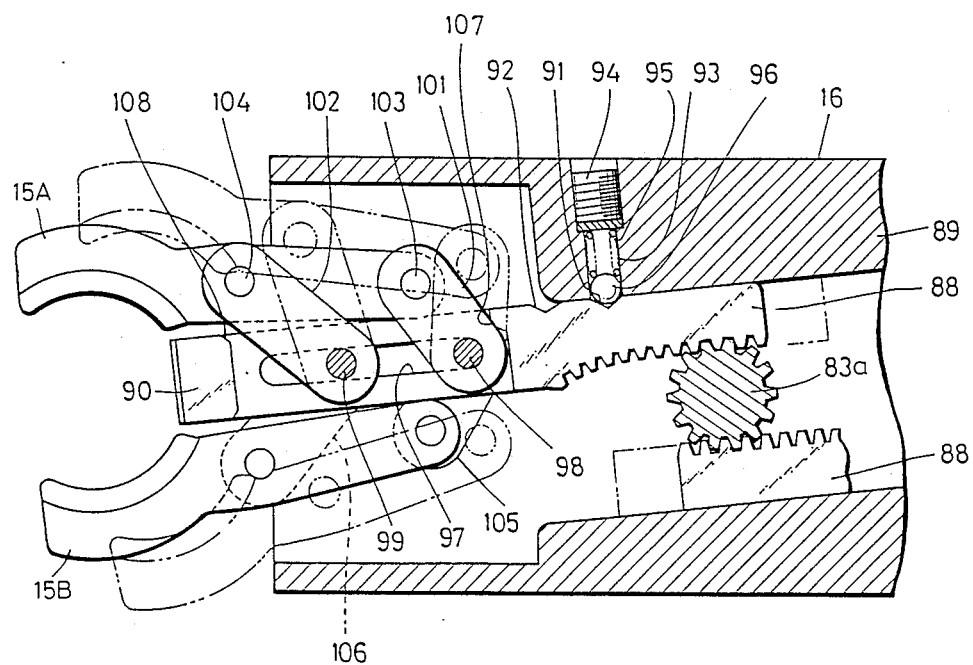
FIG. 10 is a cross sectional view taken along the line X—X of FIG. 5 and showing a swing arm.

Described next is a mechanism for opening and closing the tool holding claws 16 in response to the rotation of the rotary rod 33 with reference to FIGS. 5 and 10. FIG. 10 is a cross-sectional view taken along the line X—X of FIG. 5. The lower end portion of the rotary rod 33 is provided with a cylindrical socket 80 through a pin 81 (FIG. 5). The outer peripheral surface of the socket 80 is in slide contact with the inner peripheral surface of the second sleeve 30, so that the lower end portion of the rotary rod 33 is coaxial with the second sleeve 30. An engagement pin 82 extends radially outwardly from the lower end of the rotary rod 33.

The lower end of the second sleeve 30 is fixed with the swing arm 16. At an interior center portion of the swing arm, a pinion shaft 83 is vertically supported through bearings 84 88. The upper planar end of the pinion shaft 83 is formed with a U-shaped groove 86 engageable with the engagement pin 82 of the rotary rod 33. As shown in FIG. 5, when the second sleeve 30 is brought into an uppermost position, the engagement pin 82 is brought into engagement with the U-shape groove 86, so that the pinion shaft 83 is rotated in accordance with the rotation of the rotary rod 33.

Within the swing arm 16, rack members 88 are slidably disposed along side walls of a casing 89 as shown in FIG. 10. The rack members 88 are moveable in a lengthwise direction of the swing arm, and are engaged with the pinion 83a of the pinion shaft 83. The rack member 88 has a tip end portion 90 which serves as a notch projecting from the casing 89, to thereby engage a groove of the tool holder. The side wall of the rack 88 in sliding contact with the casing 89 is formed with two V-shaped grooves 91 92 each extending in vertical direction, while the casing 89 is formed with a bore 93 extending in horizontal direction at a position confronting with the V-shaped grooves. in the bore 93, a ball 96 is disposed which is urged toward the grooves by a coil spring 96. The biasing force of the spring 95 is controllable by a thread 94 threadingly engaged with the bore 93. The ball 96 is selectively engageable with one of the V-shaped grooves 91 92 in accordance with the advance or retract movement of the rack 88, so that rack 88 advanced and retracted positions are maintained. The rack 88 is also formed with an elongated slot 97 at its central portion, through which two fixing pins 98 99 extend. These pins 98 99 are fixedly secured to the casing 89. Becase of the formation of the slot 97, the rack 88 is movable despite the provision of the pins 98 99.

One of the tool holding claws 15A is connected to the fixing pins 98 99 by two lever members 101 102. Each of the lever members 101 102 is connected to the claw 15A through pins 103 104 and is swingably provided. More specifically, the levers 101 102 connecting to one of the claws 15A are connected to the fixing pins 98 99 at the upper portion of the rack 88, while the other lever members 105 106 connecting to the other tool holding claw 15B are connected to the fixing pins 98 99 at the lower portion of the rack 88. The swing arm casing 89 has a free end portion whose thickness is small in order to provide sufficient interior space, to thus permit the swingable movement of the levers 101 102 105 106, Which space is positioned adjacent the elongated slot 97.

When the pinion shaft 83 is drivingly rotated to provide advance movement of the rack member 88, a stepped portion 107 of the rack urges the side surface of the lever 101, so that the lever 101 is rotated about the fixing pin 98, to thereby close the tool holding claw 15A. in this instance, the ball 96 is brought into engagement with the V-shaped groove 91 for maintaining the rack 88 in a position. After that state, the rack member 88 is not displaced because of the angularly positional relationship of the levers 101,102,105 106, even if mechanical interconnection between the pinion shaft 83 and the rotary rod 33 is lost due to disengagement of the engagement pin 82 of the rotary rod 33 from the U-shaped groove 86 attendant to the downward movement of the second sleeve 30. If the pinion shaft 83 is reversely rotated by the reverse rotation of the rotary rod 33, the rack member 88 is retracted, so that a stepped portion 108 formed at the front portion of the rack member 88 urges the side wall surface of the lever member 102 (the lever member 102 is rotated in clockwise direction in FIG. 10) for opening the tool holding claw 15A.

Figure 11:
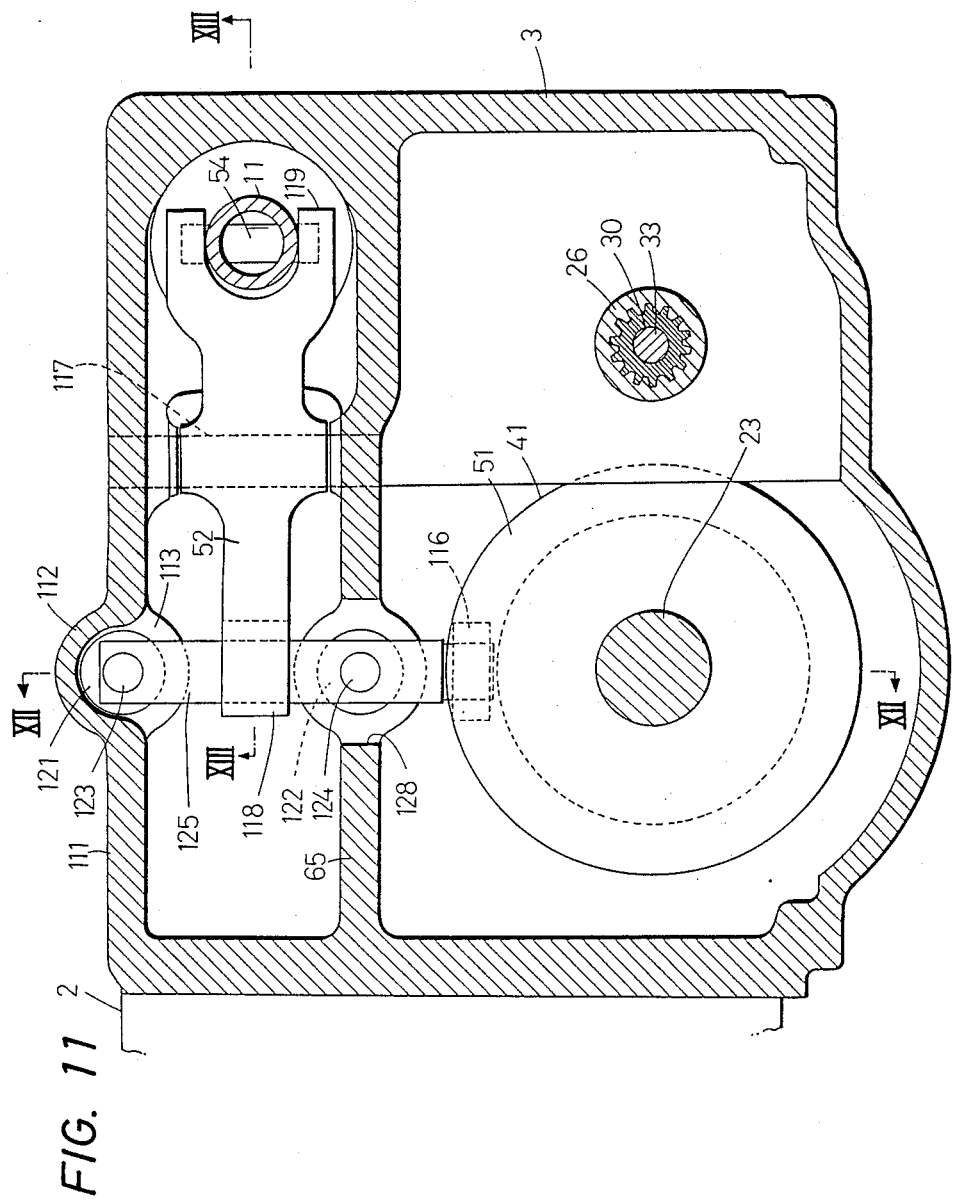
FIG. 11 is a cross sectional view taken along the line XI—XI of FIG. 4 and showing a second circumferential grooved cam (fourth cam)
Figure 12:
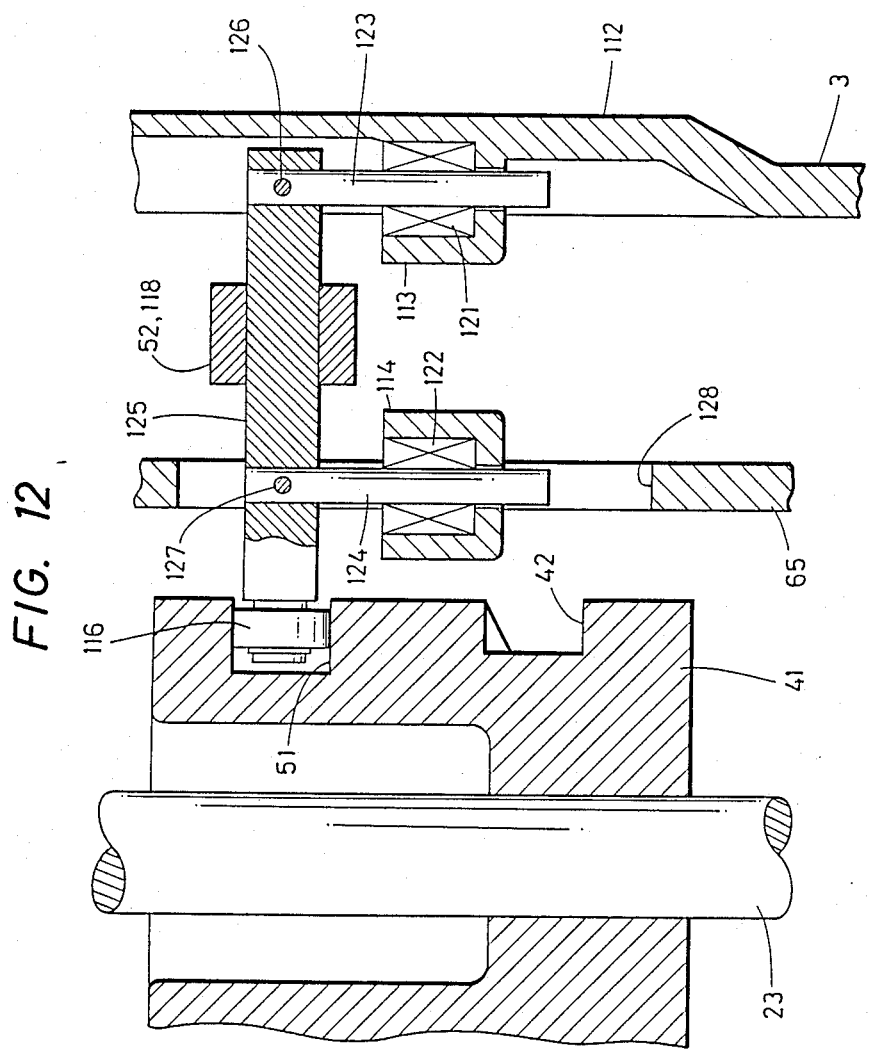
FIG. 12 is a cross-sectional view taken along the line XII—XII of FIG. 11.
Figure 13:
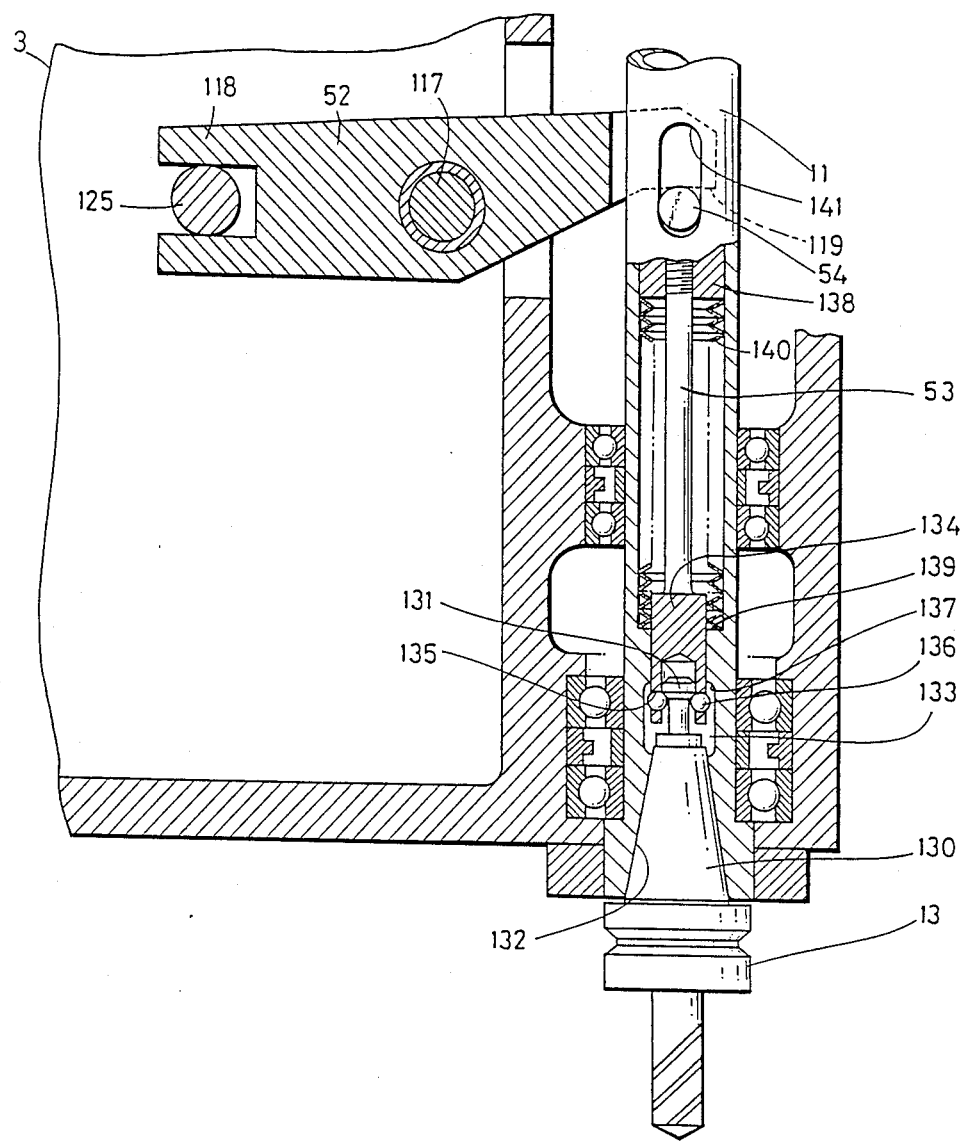
FIG. 13 is a cross-sectional view taken along the line XIII—XIII of FIG. 11 and showing a main spindle.

A mechanism for driving the tool detachable mount mechanism will be described with reference to FIGS. 11-13, wherein FIG. 11 is a cross-sectional view taken along the line XI—XI of FIG. 4, FIG. 12 is a cross-sectional view taken along the line XII—XII of FIG. 11, line XIII—XIII of FIG. 11 and showing the main spindle.

As shown FIGS. 11 and 12, a side Wall 111 of the main spindle head 3 is formed with protruded portion 112 projecting sidewardly and extending vertically. Inside the protruded portion 112, provided is a flanged portion 113 which defines a cylindrical space at its internal surface. Further, the main spindle head 3 has an inner partition wall 65 provided with a flanged portion 114 defining a cylindrical space which space is approximately the same as the space of the flange 113. Slip bearings 121 122 are provided in spaces of the flanges 113 114, respectively, and supporting rods 123 124 are vertically slidably supported by the bearings 121 122, respectively. At the upper end portions of the supporting rods 123, a connecting member 125 is fixed by means of threads 126 127. As shown in FIG. 11, one end of the connecting member 125 extends, through a window of the partition wall 65, into a chamber in which the ATC drive shaft 23 is disposed. At the end of the connecting member 125, a cam follower 116 is rotatably secured for engaging the circumferential cam 51 (fourth cam, or the second grooved cam).

The pivot member 52 extends to a direction perpendicular to the connecting member 125. A longtudinally center portion of the pivot member 52 is pivotally supported by a horizontally extending shaft 117 extending between the side wall 111 and the partition wall 65, so that free ends of the pivot member 52 are movable in vertical direction. The one end of the pivot member 52 is provided with a bifurcated portion 118 (FIG. 13) forked in vertical direction so as to interpose the axially center portion of the connecting member 125 (FIG. 11), while the other end of the pivot member 52 is provided with a y-shaped bifurcated portion 119 (FIG 11) bifurcated in horizontal direction so as to urge the tool release pin 54 projecting from the main spindle 11.

When the cam follower 116 is engaged with the vertically lower level portion of the circumferential grooved cam 51, the Y-shaped bifurcated portion 119 is moved away from the tool release pin 54. On the other hand, when the am follower 116 engages the vertically higher level portion of the grooved cam 51, the bifurcated portion 119 moves downwardly to press the pin 54.

A tool detachable mount mechanism will be described with reference to FIG. 13. This mechanism is adapted to detachably secure the tool 13 to the main spindle, the tool including a tapered arbor 130 and a pull stud 131. The axial end portion of the main spindle 11 is formed with a tapered hole 132 with which the arbor 130 is closely fitted. The tapered hole 132 is in communication with a collet chamber 133 positioned above the hole 132, and a cylindrical collet 134 are axially slidably disposed in the collet chamber 133. A plurality of tapered holes 135 are formed at a circumferential portion of the collet 134, and balls 136 are provided in the holes 135 in such a manner that the balls surround a neck portion of the pull stud 131. When the collet 134 moves upwardly, each of the balls 136 is urged by a tapered corner 137 at the upper portion of the collet chamber 133, so that the balls move radially inwardly, to thereby clamp the neck portion of the pull stud 131, whereby the pull stud 131 is also moved upwardly. On the other hand, when the collet 134 moves downwardly, the balls moves radially outwardly because of the increased diameter portion of the collet chamber side wall, so that the pull stud 131 can pass through the collet 134 because of no blockage by the balls as shown in FIG. 13.

A draw bar 53 has a lower end portion connected to the upper end face of the collet 134, while the upper end portion of the draw bar 53 is fixed with a plug 138 by threading engagement therewith. The plug 138 is disposed slidable relative to a hollow space of the main spindle 11. A stepped portion 139 is provided at the hollow space of the main spindle, and a group of compressed belleville springs 140 are resiliently and compressingly interposed between the plug 138 and the stepped portion 139. The draw bar 53 and the collet 134 are urged upwardly by the biasing force of the belleville springs 140, since the plug 138 is urged upwardly. A pair of slots 141 are formed at diametrically opposite sides of the main spindle 11 and extending in the axial direction thereof. The tool release pin 54 projecting radially outwardly from the plug 138 passes through the slots 141 and projects out of the slots 141.

If the y-shaped bifurcated portion 119 of the pivot member 52 downwardly urges the tool release pin 54 against the biasing force of the belleville springs 140, the tool 13 is brought into its unclamped condition.

Figure 14:
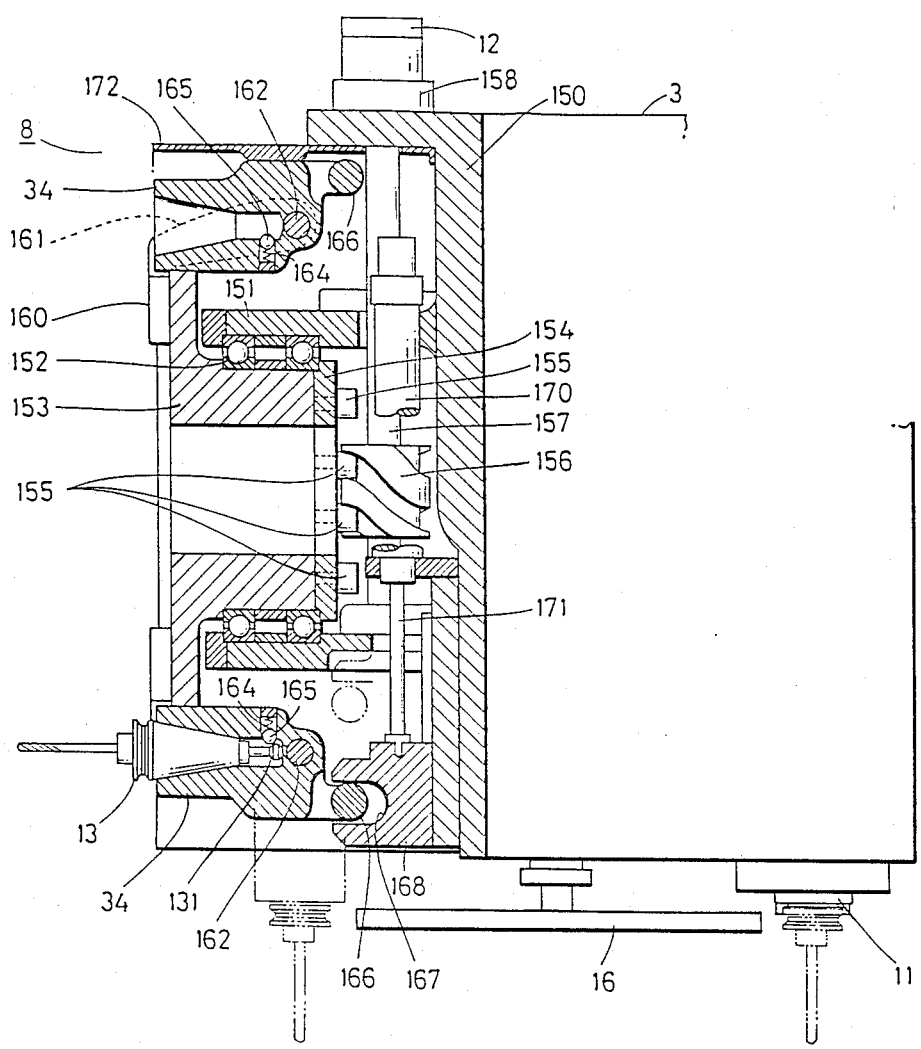
FIG. 14 is a cross sectional view taken along the line XIV—XIV of FIG. 3 and showing a tool magazine.

A construction of the tool magazine 8 will be described with reference to FIG. 14 which is a cross-sectional view taken along the line XIV—XIV of FIG. 3. In FIG. 14, the tool magazine includes a frame 150 whose central portion is provided with a cylindrical member 151 projecting in horizontal direction. A rotary sleeve member 153 is rotatably supported by the cylindrical member 151 through a bearing 152. At an axially inner end of the rotary sleeve 153, an annular member 154 is fixedly secured, and a plurality of rollers 155 are provided at the same imaginary circle delineatable on the annular member 154. These rollers 155 serve as cam followers engageable with a barrel cam 156.

A cam shaft 157 vertically extends in the magazine frame 150, and is rotatably supported thereby. The barrel cam 156 is in the form of a cylindrial member formed with spiral groove at an outer peripheral surface thereof, and the cam 186 is fixed to the cam shaft 157. The plurality of rollers 185 are engageable with the spiral groove. The cam shaft 157 is coupled to a magazine motor 12 provided above the frame 150 through a speed reduction means 158. With the structure, upon rotation of the cam shaft 157, the rollers 155 are successively engaged with the barrel cam 156 to rotate the rotary sleeve 153.

Support members 160 are fixed to the surface of the rotary sleeve 153 for supporting a plurality of tool pods 34. The support members 160 extend radially outwardly from a disk surface of the rotary sleeve 153, and protrude inwardly(rightwardly in FIG. 14) as shown by a broken line along outer peripheral surface of the sleeve 153. The protruded portions 161 have support shafts 162 to Which the tool pods 34 are pivotally supported.

Each of the tool pods 34 is provided with a latch mechanism which includes a ball 165 and a compression spring 164 urging the ball. When the tool 13 is forcibly inserted into the pod 34, the ball 165 moves radially outwardly with respect to the pod 34 against the biasing force of the spring 164. Thereafter, the ball engages the pull stud 131 of the tool 13 by the spring bias, so that the tool 13 is supported by the pod 34. When the tool 13 is forcibly pulled, the pull stud 131 urges the ball 165 radially outwardly, so that the tool 13 is removed from the pod 34.

A pin 166 is provided at a rear end of each of the pods 34. A slider 168 is provided within the frame 150 and at a lower portion thereof. The slider 168 is formed with a U-shaped groove 167 engageable with the pin 166 and is vertically slidable along a wall of the frame 150. The slider 168 is connected to a piston rod 171 of a preumatic cylinder 170. With the structure, the pin 166 in one of the tool pods 34 indexed at the lowermost position is engaged with the U-shaped groove 167 of the slider 168, when the piston rod 171 is at the most extendable position. When the piston rod is retracted, for moving the slider 168 upwardly, the indexed tool pod 34 is pivoted by 90 degrees about the support shaft 162 as shown by two-dotted chain line in FIG. 14. As a result, the pod 34 is protects out of the magazine and is maintained at its position which position is available for the replacement of the tools relative to the swing arm 16. A cylindrical cover 172 is disposed over the magazine periphery for the purpose of protection. The cover 172 is formed with a recess at its lowermost portion for allowing the tool pod 34 to project therethrough.

Figure 15:
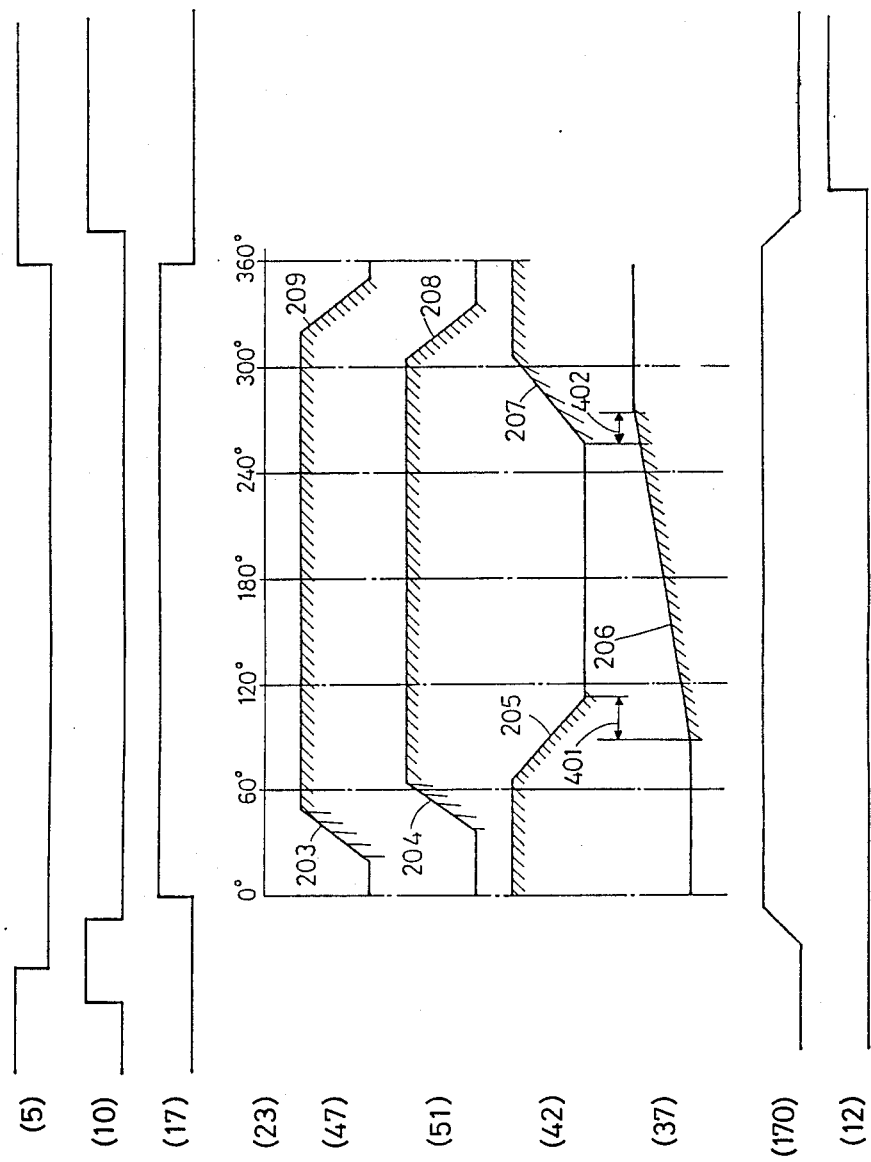
FIG. 15 is a timing chart of this invention.
Figure 16:
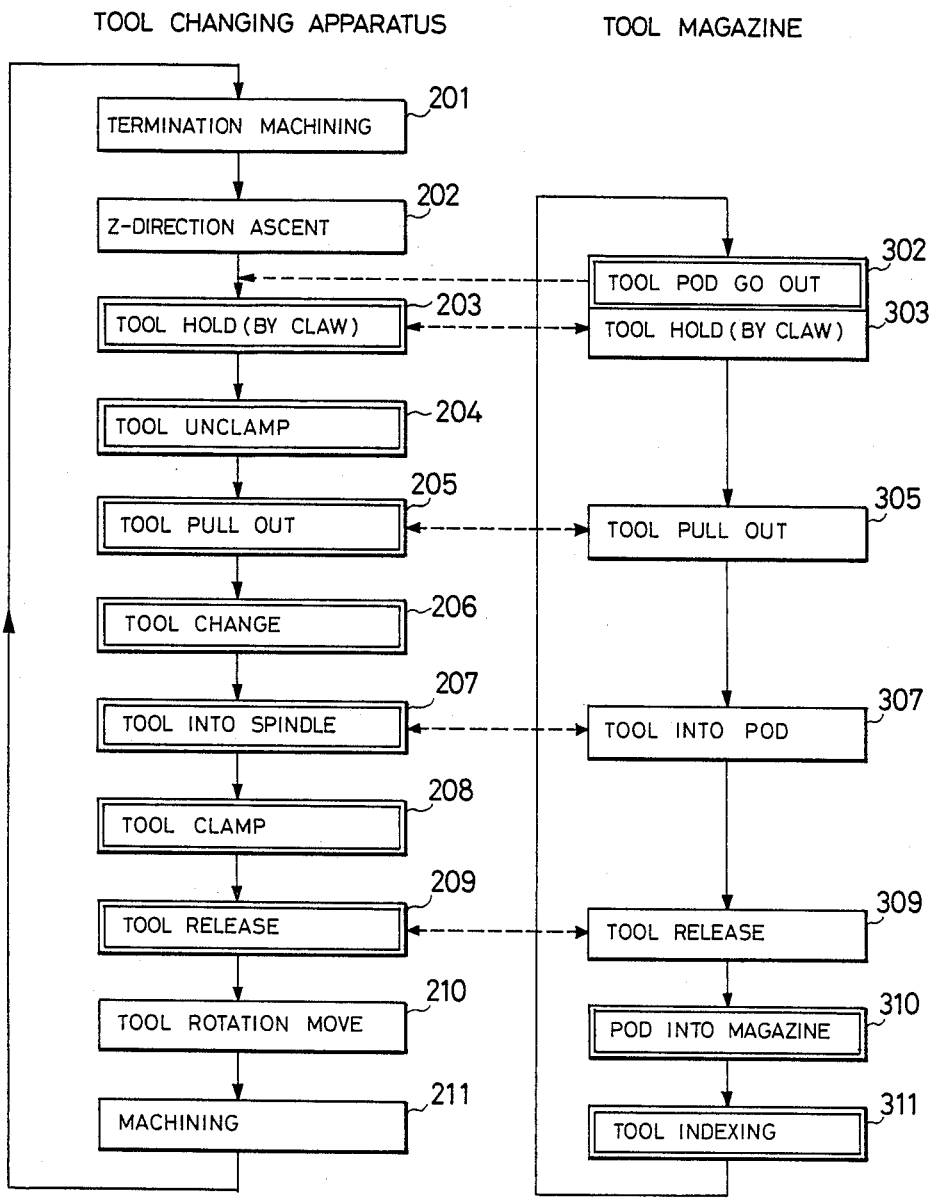
FIG. 16 is an operational sequence diagram according to the present invention.

With the construction thus organized, operation mode according to the present invention will be described with reference to FIGS. 15 and 16. FIG. 15 is a timing chart showing operation of the automatic tool changing apparatus of this invention, and FIG. 16 is an operation sequence flow diagram.

Upon completion of the machining (see 201 of FIG. 16), Z-direction drive motor 5 is energized so as to ascend the main spindle head 3, to thereby prevent the tool 13 from mechanical interference with the workpiece (see 202). At the same time, the main spindle 11 terminates its revolution and is maintained at a position (see 202). Further, the piston rod 171 of the tool magazine 8 is retracted to pivot the tool pod 34 by 90 degrees, so that the pod 34 ia maintained in a position which permits tool change (see 302).

After acknowledgement of the stop of the revolution of the main spindle 11, ATC motor 17 is immediately energized for starting rotation of the ATC drive shaft 23. When the ATC drive shaft 23 is rotated by about 20 degrees, the cam follower 73 is brought into a larger radius portion of the cam groove 47, so that the rotary rod 33 is rotated to close the tool holding claws 15(see 203 and 303). Therefore, tools at the main spindle and the tool magazine are held by the swing arm 16. When the ATC drive shaft 23 is rotated by about degrees, the cam follower 116 is brought into engagement with the vertically high level portion of the grooved cam 51 (fourth cam), so that the pivot member 52 urges the tool release pin 54 downwardly, whereby the tool 13 held by the main spindle 11 becomes unclamped condition(see 204). Further, when the ATC drive shaft 23 is rotated by about 65 degrees, the cam follower 67 is brought into engagement with the vertically lower level portion of the cam groove 42 (second cam), so that the second sleeve 30 is moved downwardly by way of the link 43. As a result, the tools 13 in the tool pod 34 and in the main spindle 11 are started for their removal (see 205 and 305). Tool removals are conducted when the ATC drive shaft 23 are rotated by from 65 degrees to 115 degrees. One the other hand, when the ATC drive shaft 23 is rotated by about 90 degrees, cam lobes 35B and 36B in the plate cams 35 36 of the parallel cam 37 (first cam) are brought into contact with the follower rollers 39 40, so that the first sleeve 26 are rotated about its axis, whereby the swing arm 16 is rotated about the axis of the second sleeve 30 (see 206). Here, during the rotation of the ATC drive shaft from 90 to 115 degrees, part of the tool removing operation by the downward movement of the second sleeve 20 is overlapped with the part of the tool changing operation by the rotation of the swing arm 16 (see 401 of FIG. 15). This overlapping operations can minimize the tool changing period. The swing arm 16 is rotated by 180 degrees to replace the tool changing positions between the magazine and the main spindle during the rotation of the ATC drive shaft 23 from its 90 to 270 degrees.

When the ATC drive shaft 23 is rotated by about 255 degrees, the cam follower 67 is brought into engagement with the vertically higher level portion of the cam groove 42 (second cam, first circumferential cam), so that the second sleeve 30 is moved upwardly so as to insert the newly exchanged tools into the main spindle 11 and into the tool pod 34 of the tool magazine (see 207 and 307). Here, rotation of the swing arm 16 is performed simultaneous with the upward movement thereof, to thus minimize the tool changing period (see 402 of FIG. 15). Next, when the ATC drive shaft 23 is rotated by 305 degrees, the cam follower 116 is brought into engagement with the vertically lower level portion of the cam groove 51 ( fourth cam, second circumferential cam), so that the pivot arm end is moved away from the tool release pin 84. As a result, the tool 13 is clamped to the main spindle because of the biasing force of the belleville springs 140 (see 208). During the rotation of the ATC drive shaft from its 320 to 350 degrees, the cam follower 73 is brought into engagement with the small radius portion of the cam groove 43 (third cam), so that the rotary rod 33 is reversely rotated for opening the tool holding claws 15, whereby the tool 13 is disengaged from the swing arm 16 (see 209,309).

Upon completion of a single rotation of the ATC drive shaft 23 to recover its original angular position, ATC motor 17 is deenergized to terminate the tool exchanging operation. Upon termination, Z-direction drive motor 5 and the main spindle motor 10 are immediately energized (see 210) for the machining (see 211). On the other hand, in the tool magazine 8, piston rod 171 is extended to reversely rotate the tool pod 34 by 90 degrees, so that the pod 34 is accomodated in the magazine (see 310). Thereafter, the magazine motor 12 is energized for the tool indexing (see 311) and is maintained in its stand-by position for the next tool replacement and machining.

In FIG. 15, cam shapes of the cams 37, 42, 47 and 51 are linearly delineated for simplicity. However, in reality, each of the cams has smoothly curved configuration in order to perform high speed operation avoiding any mechanical shock between neighbouring mechanical components.

As described above, the present invention provides the following advantages.

(1) Tool changing period can be minimized, since several operations can be partly overlapped with each other, such as the rotation of the swing arm 16 during its descent (see 401,402 of FIG. 15) in tool changing operation.

(2) Cam members are formed of grooved cam 47 formed on a flat plate member, first and second circumferential grooved cams 42 51 formed on the peripheral portion of the cylindrical member, and juxtaposed plate cam 37 whose outer peripheral surface serves as camming surface, so that the opponent members on follower sides can be surely driven even at high speed operation. Therefore, operational overlap can be maximumly provided such as rotation of the swing arm during its descent, to thereby minimize the entire operation period.

(3) Since various tool changing mechanisms such as the tool magazine 8, swing arm etc. are mounted on the main spindle head, tool replacement is attainable regardless of the position of the main spindle head, and it is unnecessary to move the main spindle head to a specific tool changing position.

(4) Since the barrel cam 156 is employed for indexing one of the tools in the tool magazine 8, formation of notch for magazine indexing is not required, and noise generation is eliminated. Further, since the barrel cam 156 functions as a self-locking means which prevents the rotary sleeve 153 from its free rotation. Therefore, even if the various tools having their weight different from one another are installed into the tool magazine, 15 the tool magazine will not be rotated due to imbalance of the tools. Furthermore, overrotation due to inertia force of the magazine can be prevented when the magazine motor 12 is deenergized because of the stop of the rotation of the barrel cam 156.

(5) Simplified and easily controllable operation mode is obtainable, since each of the cam members 37, 42, 47 and 51 mounted on the ATC drive shaft performs their single tool changing operations by the single rotation of the ATC drive shaft.

in view of the foregoing, according to the present invention, high speed tool changing operation is realized with minimized operation period, since the plurality of cams mounted on the single drive shaft can perform sequential tool changing operation which includes tool clamp and unclamping in the main spindle.

While the invention has been described in detail and with reference to the specific embodiment thereof, it will be apparent to one skilled in the art that various changes and modifications can be made therein without departing from the spirit and scope of the invention.

We claim:

1. A tool changing apparatus comprising:
 a main spindle head;
 a main spindle rotatably disposed in said main spindle head; said main spindle having a tool detachable mount means;
 a tool magazine;

a first sleeve rotatably supported by said main spindle head;

a second sleeve disposed slidable in axial direction thereof and rotatable together with said first sleeve;

a swing arm disposed at one end of said second sleeve;

tool holding claws provided at said swing arm;

claw opening and closing means disposed in said swing arm; a tool in said main spindle being changed with a tool in said tool magazine upon rotation of said swing arm about said second sleeve and movement of said swing arm in an axial direction of said second sleeve;

a drive shaft rotatably supported by said main spindle head and driven by a motor;

first to fourth cam members operable by the rotation of said drive shaft;

a cam-index mechanism operable in response to said first cam member for rotating said first sleeve about its axis and for controlling rotational angular position thereof;

a shaft drive mechanism operable in response to said second cam member for moving said second sleeve in axial direction thereof and for controlling its axial position;

a claw driving mechanism operable in response to said third cam for driving said claw opening and closing mechanism to open and close said tool holding claws; and, a tool clamp-unclamp driving mechanism operable in respose to said fourth cam for driving said tool detachable mount means.

2. The apparatus as claimed in claim 1, wherein said first to fourth cam members have cam configurations, so that single tool changing operation is performed upon a single rotation of said drive shaft.

3. The apparatus as claimed in claim 1, wherein said cam index mechanism comprises said first cam member and a cam follower, said first cam member comprising composite cams juxtapose with each other, and said cam follower comprising follower rollers and fixed to said first sleeve.

4. The apparatus as claimed in claim 1, wherein said second cam member comprises a first circumferential grooved cam mounted on said drive shaft, and wherein said shaft drive mechanism comprises a swing lever pivotable in response to said second cam member, a contact piece provided at one end of said swing lever, and a grooved portion mounted on said second sleeve and engaged with said contact piece.

5. The apparatus as claimed in claim 1, wherein said third cam member comprises a plate member formed with a grooved cam at its flat surface portion, and wherein said claw driving mechanism comprises a rotary rod having one end portion rotatably supported by said main spindle head and a remaining portion extending through said second sleeve, engaging means provided at the other end portion of said rotary rod, said engaging means being engageable with a drive portion of said claw opening and closing means when said second sleeve is at axially retracted position;

a pinion mounted at the one end portion of said rotary rod; and, a rack member operable in response to said third cam and engagable with said pinion.

6. The apparatus as claimed in claim 1, wherein said fourth cam member comprises a second circumferential grooved cam, and wherein said tool clamp unclamp driving mechanism comprises:

a pivot member pivotable in response to said fourth cam member;

a draw bar in said tool detachable mount means of said main spindle; and, a pin connected to said draw bar and extending out of said main spindle, said pivot member selectively urging said pin responsive to said fourth cam member.

7. The apparatus as claimed in claim 3, wherein said first cam member (37) has a first cam portion (206) engageable with said follower rollers for rotating said swing arm by 180 degrees, and a second cam portion disengageable from said follower rollers for stationarily maintaining said swing arm.

8. The apparatus as claimed in claim 4, wherein said second cam member (42) has a first cam portion (205) for moving said second sleeve in one axial direction to remove said tools from said tool magazine and from said main spindle, a second cam portion for maintaining a first stationary position of said second sleeve, a third cam portion (207) for moving said second sleeve in opposite axial direction to insert said tools into said main spindle and said tool magazine, and a fourth cam portion for maintaining a second stationary position of said second sleeve.

9. The apparatus as claimed in claims 7 and 8, wherein a part of said first cam portion (206) of said first cam member (37) is overlapped with said first and third cam portions (205,207) of said second cam member (42).

10. The apparatus as claimed in claim 5, wherein said third cam member (47) has a first cam portion (203) for moving said rack member in one direction to rotate said rotary rod to thereby close said tool holding claws, a second cam portion for maintaining closing state of said claws, a third cam portion (209) for moving said rack member in opposite direction to open said tool holding claws, and a fourth cam portion for maintaining opening state of said claws.

11. The apparatus as claimed in claim 6, wherein said fourth cam member (51) has a first cam portion (204) for urging said pin downwardly to provide tool unclamping state in said main spindle, a second cam portion for maintaining said tool unclamping state, a third cam portion (209) for releasing said pin to provide tool clamping state in said main spindle, and a fourth cam portion for maintaining said tool clamping state.

12. The apparatus as claimed in claims 10 and 11, wherein said first cam portion (203) of said third cam member (47) is partially overlapped with said first cam portion (204) of said fourth cam member (51), and wherein said second cam portion of said fourth cam member (51) is overlapped with said second cam portion of said third cam member (47), and wherein said third cam portion (209) of said third cam member (47) is partially overlapped with said third cam portion (208) of said fourth cam member (51), and wherein said fourth cam portion of said third cam member (47) is overlapped with said fourth cam portion of said fourth cam member (51).

13. The apparatus as claimed in claim 1, wherein said tool magazine is mounted on said main spindle head.

* * * * *